United States Patent
Khokhlov et al.

(10) Patent No.: US 12,531,244 B2
(45) Date of Patent: Jan. 20, 2026

(54) POLYMER COATING PROCESS FOR ELECTRODE ASSEMBLIES INCORPORATING ION EXCHANGE MATERIALS

(71) Applicant: Zelos Energy Ltd., San Leandro, CA (US)

(72) Inventors: Pavel Khokhlov, San Ramon, CA (US); Alexander Gorer, Brisbane, CA (US)

(73) Assignee: Zelos Energy Ltd., San Leandro, CA (US)

( * ) Notice: Subject to any disclaimer, the term of this patent is extended or adjusted under 35 U.S.C. 154(b) by 528 days.

(21) Appl. No.: 17/242,844

(22) Filed: Apr. 28, 2021

(65) Prior Publication Data

US 2021/0336266 A1    Oct. 28, 2021

Related U.S. Application Data

(60) Provisional application No. 63/016,827, filed on Apr. 28, 2020.

(51) Int. Cl.

| | |
|---|---|
| *H01M 4/62* | (2006.01) |
| *H01M 4/04* | (2006.01) |
| *H01M 4/134* | (2010.01) |
| *H01M 4/1395* | (2010.01) |
| *H01M 4/1397* | (2010.01) |
| *H01M 4/02* | (2006.01) |

(52) U.S. Cl.
CPC ......... *H01M 4/62* (2013.01); *H01M 4/0402* (2013.01); *H01M 4/134* (2013.01); *H01M 4/1395* (2013.01); *H01M 4/1397* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 4,888,098 A | 12/1989 | Nyberg |
| 2018/0175354 A1 | 6/2018 | Tokushima et al. |
| 2020/0083505 A1 | 3/2020 | Kaye et al. |
| 2021/0104746 A1 | 4/2021 | Farmer et al. |
| 2021/0351458 A1* | 11/2021 | Khokhlov ............. H01M 4/483 |

FOREIGN PATENT DOCUMENTS

WO    2014078801 A1    5/2014

OTHER PUBLICATIONS

Pyridinium Hydrochloride. Datasheet (Online}. Sigma Aldrich Co., LLC. May 12, 2020 (retrieved on Jun. 23, 2021). Retrieved from the Internet: <URL: https://www.sigmaaldrich.com/US/en/sds/aldrich/243086 p. 3, section 3.1, p. 5.

* cited by examiner

*Primary Examiner* — Tracy M Dove
(74) *Attorney, Agent, or Firm* — Polygon IP, LLP

(57) ABSTRACT

A method of manufacturing a battery cell includes forming an electrode and coating the electrode with a n-mer solution. The n-mer coated electrode is treated by heat, ultraviolet, or cross linking agents to polymerize the n-mer and form an ion exchange material that covers at least some of the electrode.

16 Claims, 13 Drawing Sheets

300

1100

POLYMER COATING PROCESS FOR ELECTRODE ASSEMBLIES INCORPORATING ION EXCHANGE MATERIALS

RELATED APPLICATIONS

This application claims the benefit of U.S. Provisional Application Ser. No. 63/016,827, filed Apr. 28, 2020, which is hereby incorporated herein by reference in its entirety for all purposes.

TECHNICAL FIELD

The present disclosure relates generally to the field of batteries and components for batteries. More specifically, the present application relates to improved processes for coating electrode materials with ion exchange material.

BACKGROUND

There is a great demand for low-cost rechargeable battery systems with a high energy density for portable devices, electric vehicles, grid storage, and other applications. Unfortunately, many battery systems require complex assembly of multiple components, such as electrode material, separators, collectors, and casings. Pinholes or leaks in separators or casings can result in non-operation, leakage of caustic or acidic chemical agents, and damage to products powered by a battery.

Battery systems that are useful for a variety of battery chemistries, can be inexpensively constructed, have a high reliability, and require minimal assembly steps or discrete components are needed.

SUMMARY

In one embodiment, a process of manufacturing a primary or rechargeable battery cell can include forming an electrode and coating the electrode with an n-mer. An n-mer can include compositions with repeating units where n is selected to range from one to millions, including but not limited to monomers, oligomers (di-mers, tri-mers, etc), and branched or unbranched polymers. The n-mer coated electrode is processed to polymerize the n-mer and form an ion exchange material that covers at least some of the electrode. In some embodiments, coating further includes dipping, spraying, or otherwise completely or partially coating the electrode with the n-mer solution. The electrode and the n-mer can be placed into a battery casing either before or after polymerization.

In some embodiments, n-mer processing can include polymerization. In other embodiments, n-mer processing can include crosslinking or curing using at least one of heat, ultraviolet, or chemical agents. In some embodiments polymerization and crosslinking can occur simultaneously, while in other embodiments polymerization is followed by crosslinking. In some embodiments a polymerized and/or crosslinked ion exchange material can be arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material. In another embodiment, electrode particles can be mixed or otherwise intermingled with ion exchange material.

In some embodiments the electrode can include a zinc (Zn) or ZnO containing anode. In other embodiments the electrode is a cathode including at least one of nickel hydroxide ($Ni(OH)_2$), nickel oxyhydroxide (NiOOH), manganese dioxide ($MnO_2$), manganese oxide (MnO), ferrate salts (Fe(VI)), manganate salts (Mn(VI)), permanganate salts (Mn(VII)).

The electrode can at least partially include electrode particles sized to be less than 300 microns and packed to have a pore volume less than 50% of total electrode volume.

In some embodiments the ion exchange material can include either an anion exchange material or a cation exchange material. The ion exchange material can include a polymeric material having attached charged functional groups.

In some embodiments, ion transport can be enabled by a liquid alkaline electrolyte contacting the electrodes. Optionally, the electrolyte can have at least some incorporated ion exchange material.

In one embodiment, the rechargeable battery cell can include an electrode that includes a plurality of particles and an ion exchange material contacting and surrounding at least a portion of particles of the electrode.

In one embodiment, the rechargeable battery cell can include an electrode comprising a plurality of particles an ion exchange material contacting and completely surrounding a surface of at least some of the plurality of particles.

In one embodiment, the rechargeable battery cell can include an electrode comprising a plurality of particles and an ion exchange material arranged to embed substantially all of the plurality particles of the electrode.

In one embodiment, a method of manufacturing a rechargeable battery cell can include forming a plurality of particles into an electrode and embedding or mixing an ion exchange material into at least some of the plurality particles of the electrode. Embedding can involve at least one of melting, softening, depositing from a melt or solution, laminating, and pressure application. Some other techniques exist.

In some embodiments, manufacture can involve soaking the electrode in a liquid electrolyte.

In some embodiments, manufacture can involve assembling the electrode and the ion exchange material into a battery prior to embedding or mixing the ion exchange material into at least some of the plurality particles.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

The present disclosure relates in part to battery cells having improved cycle life and electrical performance in service. For example, the battery cells can exhibit higher battery discharge voltage, higher discharge capacity, lower internal resistance, and high-rate discharge capability. In some embodiments, the disclosed battery cells have a long cycle lifetime at high-rate discharge current.

Figure 1:
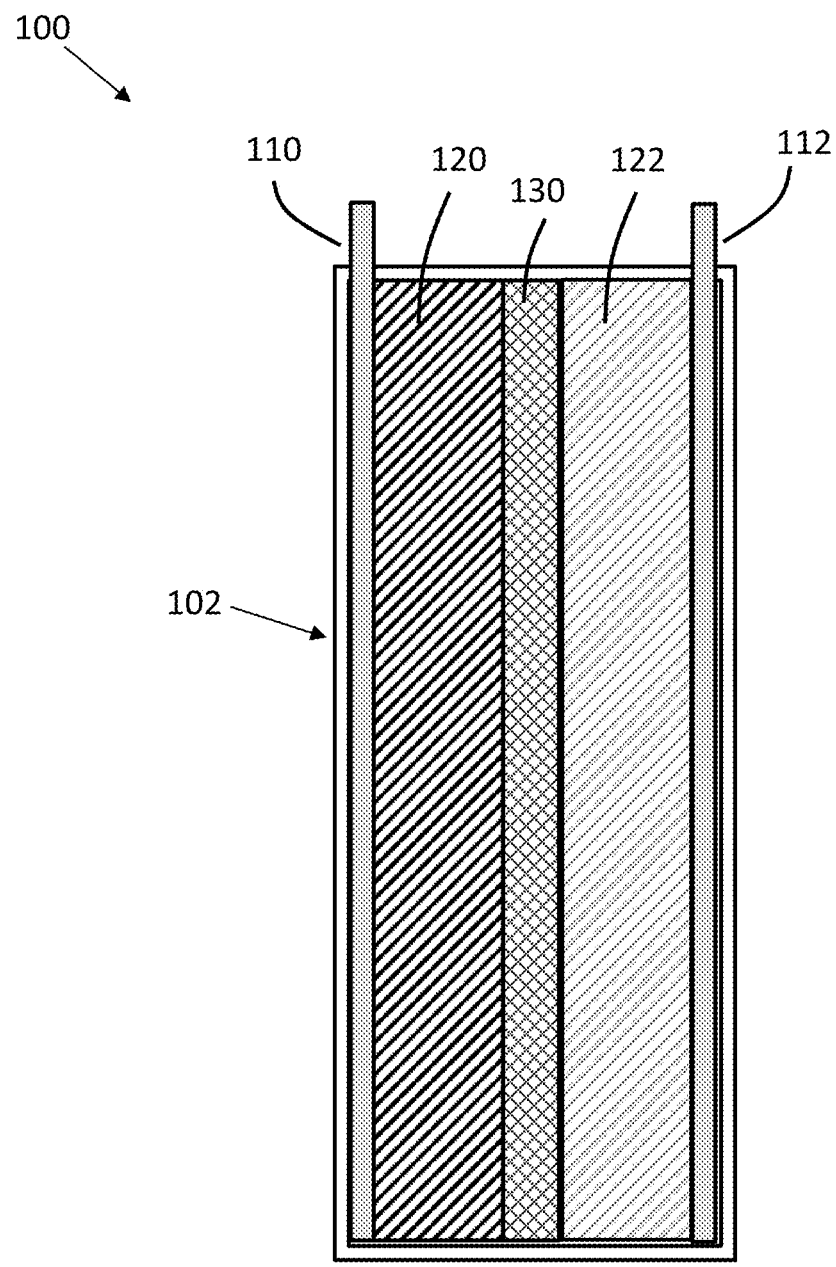
FIG. 1 illustrates a battery containing ion exchange material in contact with electrode material.

FIG. 1 illustrates a rechargeable battery cell system 100 that includes a casing 102 that surrounds various battery components. Battery components can include current collectors 110 and 112 that facilitate charge and discharge of the battery cell system 100. Other components include electrode materials 120 and 122 that respectively contact current collectors 110 and 112. The electrode materials 120 and 122 are separated from each other by a separator 130 that only permits ion flow between the material. In one embodiment, electrode material can be coated with an ion exchange material that also acts as a separator. The rechargeable battery cell system 100 can include anode, cathode, ion exchange, and other materials and components as described below.

Electrodes

Electrode material can include material formed as thin films, or structured patterns such as columns, needles, groove, or slots. In some embodiments electrodes can be loosely arranged materials, rigidly bound or sintered structures, or solid continuous pore structures. In one embodiment, electrodes can be formed from particles provided in various forms such as powders, granules, pellets, or nanomaterial. In certain embodiments, particles can have an average size (diameter or longest dimension) of between about 0.1 µm to 300 µm, and in a specific embodiment, between about 100 µm and 1 µm. In some embodiments, relatively homogeneous particle sizes can be used, while in other embodiments heterogenous sized materials can be used. Particles can be processed to increase effective surface area. In some embodiments, particles can be processed by heating, melting, fusing, or sintering to bind together the particles. In other embodiments, additional binders can be used to hold particles together.

Current Collectors

At least a portion of electrode material is placed in contact with a current collector. The current collector serves to supply an electric current so that it can be consumed for the electrode reaction during charge and collect an electric current generated during discharge. The current collector is typically formed from a material which has a high electrical conductivity and is inactive to electrochemical battery cell reaction. The current collector may be shaped in a plate form, foil form, mesh form, porous form-like sponge, punched or slotted metal form, or expanded metal form.

The material of the current collector may include Ni, Ti, Cu, Al, Pt, V, Au, Zn, Fe and alloys of two or more of these metals such as stainless steel, bronze, or brass. Other embodiments may include graphite cloth, graphite foil, copper sheet or mesh slotted or woven brass.

Anode Material

Anode materials for an electrode can include a wide range of materials such as zinc, aluminum, magnesium, iron, and lithium and other metals in pure, oxide form or salt form, or combinations thereof. In some embodiments, relatively pure Zn, ZnO or a mixture of Zn and ZnO can be used. For a rechargeable zinc negative electrode, the electrochemically active material is the zinc oxide powder or a mixture of zinc and zinc oxide powder. The zinc oxide can dissolve in an alkaline electrolyte to form the zincate ($Zn(OH)_4^{2-}$). Zinc oxide or/and zincate is reduced to zinc metal during the charging process.

More broadly, anode materials can include:

Any metal M, metal oxide MOx or metal salt having a redox potential E0 lower than the redox potential of the cathode material.

Any metal oxide MOx having a redox potential E0 lower than the redox potential of the cathode material.

Any alloy of any metals MM1M2 ... Mn, mixed oxides or mixed salts having a E0 lower than the E0 of the cathode material.

Any polymer that can accommodate ions in its structure having a redox potential E0 lower than the redox potential of the cathode material.

Any mixture of one or more of the above-mentioned types of materials.

Cathode Material

Cathode material for an electrode can include a wide range of materials such as metal or metal containing compounds such as ferrate salts (Fe(VI)), manganate salts (Mn (VI)), permanganate salts (Mn (VII)), nickel hydroxide $Ni(OH)_2$, nickel oxyhydroxide NiOOH, manganese dioxide $MnO_2$, manganese oxide (MnO) or any combinations.

More broadly, cathode materials may include:

Any metal M, metal oxide MOx or metal salt having a redox potential E0 larger than the redox potential of the anode material.

Any metal oxide MOx having a redox potential E0 larger than the redox potential of the anode material.

Any alloy of any metals MM1M2 ... Mn having a E0 larger than the E0 of the anode material.

Any metal fluoride MFn having a redox potential larger than that of the anode material.

Any alloy MM1M2 ... MnOxFm with n larger than or equal to 2 and m being larger than or equal to zero.

Any polymer that can accommodate ions in its structure having a redox potential E0 larger than the redox potential of the anode material.

Any mixture of one or more of the above-mentioned type of materials.

Additives and Binding Agents

Various additives can be used to improve electrochemical, electrical, or mechanical features of the electrodes. For example, electrochemical performance can be improved by addition of nickel, nickel hydroxide, nickel oxyhydroxide, or nickel oxide containing cathode material that can incorporate or be coated with small amounts of cobalt oxide, strontium hydroxide ($Sr(OH)_2$), barium oxide (BaO), calcium hydroxide ($Ca(OH)_2$), $Fe_3O_4$, calcium fluoride ($CaF_2$), or yttrium oxide ($Y_2O_3$) to improve battery cell performance. As another example, electrode can include an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 20% by weight of a dry negative electrode formulation. Indium oxide may be present in a concentration of between about 0.05 and 10% by weight of a dry negative electrode formulation. Aluminum oxide may be provided in a concentration of between about 1 and 10% by weight of a dry negative electrode formulation.

Additionally, some additives may participate in the chemical process during the battery cycling to create new phases of electrodes and improve cycling performance and stability of the battery. Such additives can include but are not limited to $Bi_2O_3$ containing compositions.

In certain embodiments, one or more additives may be included to improve corrosion resistance of the zinc electrode material. Specific examples of anions that may be included to reduce the solubility of zinc in the electrolyte include phosphate, fluoride, borate, zincate, silicate, or stearate. Generally, these anions may be present in an electrode in concentrations of up to about 10% by weight of a dry electrode formulation.

Additives that improve electrical characteristics such as conductivity can also be added. For example, a range of carbonaceous materials can be used as electrode additives, including powdery or fibrous carbons such as graphite, coke, ketjen black, and acetylene black. Carbonaceous nanomaterials can also be used such as single or multiwalled carbon nanotubes, carbon nanofibers, multi-layered carbon nanoparticles, carbon nanowhiskers, or carbon nanorods.

Additives may be provided as chemically homogeneous components into a mixture or solution, co-precipitated, or coated onto particles Mechanical properties can be improved in one embodiment by addition of binding agents to provide increased electrode mechanical strength, and flexure or crack reduction for the electrode. Binding agents may include, for example, polymeric materials such as polytetrafluoroethylene (PTFE), polyethylene (PE), polypropylene (PP), polyisobutylene (PIB), polyvinyl alcohol (PVA), polyacrylic acid or its salts, polyvinyl acetate, carboxy methyl cellulose (CMC), styrene butadiene rubber (SBR), polyethylene oxide (PEO), polybutylene terephthalate (PBT) or polyamides, polyvinylidene fluoride (PVDF), silicone-based elastomers such as polydimethyl siloxane (PDMS) or rubber materials such as natural rubber (NR), ethylene propylene rubber (EPM) or ethylene propylene diene monomer rubber (EPDM).

Ion Exchange Material

The ion exchange material is generally selective for the transport of either cations or anions. An anion selective ion exchange material can be used alone, a cation selective ion exchange material can be used alone, or they can be used in combination with each other. In one embodiment the ion exchange material can be an organic or polymeric material having attached strongly acidic groups, such as sulfonic acid including, sodium polystyrene sulfonate, or polyAMPS. Alternatively, the ion exchange material can be an organic or polymeric material having attached strongly basic groups, such as quaternary amino groups including trimethylammonium groups (e.g. polyAPTAC). In another embodiment, the ion exchange material can be an organic or polymeric material having attached weakly acidic groups, including carboxylic acid groups. Alternatively, the ion exchange material can be an organic or polymeric material having attached weakly basic groups, typically featuring primary, secondary, and/or tertiary amino groups (e.g. polyethylene amine).

The ion exchange material can be provided to interact with electrode material as a fully or partially embedding polymer, a particle mixture, a membrane or film, particulates or beads, or a coating. The anode alone, the cathode alone, or both the anode and cathode can be configured to interact with an ion exchange material, which can be the same or different material for the respective electrodes.

Ion Exchange Material Processing

In some embodiments, an ion exchange material can be manufactured using n-mer based coating, polymerization, or crosslinking processes. A n-mer can include compositions with repeating units where n is selected to range from one to millions, including but not limited to monomers, oligomers (di-mers, tri-mers etc), and branched or unbranched polymers. Typically, an n-mer can held in solution using a suitable solvent, or alternatively or in addition can be meltable. A n-mer can be coated over electrode material, including variously sized particles (including nanoscale to millimeter scale particles), strips, plates, needles, porous structures, or more complex structures. Polymerization through heat, UV, crosslinking agents, or combinations thereof can create a polymerized ion exchange material. In some embodiments the polymerized ion exchange material is further cross-linked. In some embodiments the polymerization and cross-linking steps happen simultaneously. In some embodiments a step of ion exchange is used to transform the ion exchange material into suitable form (for example, OH-form). The ion exchange step can include soaking of the battery components in solution containing required ions (for example, KOH solution). The ion exchange step can happen as a separate step or during soaking of the battery components in electrolyte. In some embodiments, electrode particles or structures can be coated with a n-mer and crosslinked before assembly into a battery or placement in a casing, while in other embodiments, the n-mer can be added and crosslinked after the electrode particles or structures are emplaced in a battery, positioned on a collector, or held within a casing, containment shell or containment area. In one embodiment, n-mer material can be applied by dipping the electrode material or plurality of particles formed into an electrode into a bath of the n-mer solution. In other embodiments, n-mer material can be sprayed, dripped, printed, melted, or otherwise directed to contact electrode material.

In some embodiments, a suitable n-mer(s) for forming the ion exchange material can have a range of functional groups, including ionogenic functional groups, functional group for polymerization, and/or functional groups for cross-linking. Ionogenic functional groups can include one or more of primary, secondary, tertiary or quaternary amino groups in basic or salt forms; carboxy groups in acidic or salt forms; or sulfo groups in acidic or salt forms.

Functional groups for polymerization and functional groups for cross-linking can be independently selected from the following list:
- Halogen (—Cl, —Br or —I)
- Carboxy group (—COOH)
- Amine (—NH2, —NH—)
- Alcohol (—OH)
- Thio (—SH)
- —N═C═O
- —N═C═S
- —C≡CH2
- —C≡CH—CH3
- —C≡CH
- —C≡C—CH3
- —CH═O
- —NH—NH2
- —N═N+═N—
- Epoxide In one embodiment, polymerization and/or cross-linking may be facilitated by the addition of using a cross-linking agent molecule that has a different structure from the n-mer. The cross-linking agent molecule creates molecular bridges among the n-mer molecules or polymerized n-mer molecules. The cross-linking agent molecule may have at least one functional group from the table above. Molar ratio of the cross-linking agent molecule to n-mer may be in the range from 0.5% to 50%. For example, in the case of an n-mer such as (vinylbenzyl)trimethylammonium chloride (VBTMA-Cl), cross-linking can be done using divinylbenzene (DVB) with two functional groups —C≡CH2. As another example, the addition of formaldehyde (CH2O) with a functional group —CH═O can be used to polymerize —OH (in particular, phenol) containing n-mers.

In some embodiments, a suitable n-mer(s) for forming the ion exchange material can comprise
- (3-Acrylamidopropyl)trimethylammonium compounds,
- [3-(Methacryloylamino)propyl]trimethylammonium compounds,
- [2-(Acryloyloxy)ethyl]trimethylammonium compounds,
- [2-(Methacryloyloxy)ethyl]trimethylammonium compounds,
- (Vinylbenzyl)trimethylammonium compounds, 2-Acrylamido-2-methyl-1-propanesulfonic acid compounds, 3-Sulfopropyl acrylate compounds, 3-Sulfopropyl metacrylate compounds, Diallyldimethylammonium compounds, vinylbenzenesulfonate compounds, or N-(3-Aminopropyl)methacrylamide compounds.

Electrolyte

An electrolyte is used to maintain high ionic conductivity between electrodes. Electrolytes can be aqueous based, solvent based, solid polymer, or an ionic liquid. In some embodiments, electrolytes can be semi-solid or gelatinized. Gelatinizing agents can include polymers that absorb the liquid of the electrolyte solution and swell. Such polymers can include polyethylene oxide, polyvinyl alcohol, and polyacrylamide, polyacrylic acid or polyacrylate.

In another embodiment the electrolyte can be a solid state electrolyte. In another embodiment electrolyte can be formed as a solid material with absorbed water. For example, KOH exposed to humid air.

In another embodiment electrolytes can be formed from ion exchange material such as explained above under "Ion exchange material" section.

In one embodiment aqueous alkaline electrolytes can be used. Alkaline electrolytes can include alkalis such as potassium hydroxide, sodium hydroxide, lithium hydroxide, calcium hydroxide or include inorganic salts such as zinc bromide.

Separator

A separator may be replaced with (or used in conjunction with) an ion exchange membrane or film. A conventional porous polymer separator or ion exchange separator may be provided as a polymer membrane or film. Typically, a separator is disposed between the anode and the cathode, and acts to prevent the anode and the cathode from having internal electrical shorts. In addition, the separator can also act to retain the electrolyte, particularly for battery systems that use different cathode and anode electrolyte solutions. In some embodiments, the separator has a porous structure or a structure having a number of perforations capable of allowing ions to pass while being chemically stable with respect to the electrolyte solution. In some embodiments, the separator is non-porous and comprises a layer of solid state electrolyte material, solid or gel polymer electrolyte or an ion exchange material. In some embodiments, the separator can adhere to electrodes and bind the electrodes together during application of pressure, temperature or a combination of pressure and temperature. In some embodiments, one or more separators can be formed by coating electrodes or particles that collectively form an electrode. The separator can be formed from a nonwoven fabric or a membrane having a micropore structure made of glass, polypropylene, polyethylene, resin, or polyamide. Alternatively, the separator may be constituted by a metal oxide film or a resin film combined with a metal oxide respectively having a plurality of perforations.

In some embodiments, the electrodes in the battery are covered with the ion exchange material of enough thickness to provide full coverage of the electrodes surface and avoid electrical contact between anode and cathode even if placed in direct contact with each other without a separator in between. In these embodiments, the battery does not have a separator as a separate component.

Processing

In one embodiment, a dry mixing process can be performed in which various anode and cathode materials, as well as additives and binders are mixed while dry. Optional processing steps such as heating, fusing, compressing, and melting ion exchange material can be performed before placing the mixture in a battery casing. In other embodiments, optional processing steps such as heating, fusing, compressing, and melting ion exchange material can be performed after placing the mixture in a battery casing. A liquid electrolyte can be added before sealing the battery casing.

According to other embodiments, a wet mixing process may instead be utilized. In a wet mixing process, one or more solvents are added at the beginning or during the mixing process, or, alternatively, one or more ingredients may be used in the form of a dispersion or suspension. The solvent(s) can be subsequently removed after the mixing process or at a later stage in the production process.

In other embodiments, the various individual components may be made using different methods. For example, some of the electrode may be produced using a dry mixing process, while portions of the electrode may be produced using a wet process. According to yet another embodiment, it is possible to combine both dry and wet processes for the different components.

In other embodiments, electrodes may be produced using a dry mixing process, and coated with a n-mer based ion exchange material using a wet process. In other embodiments, processing steps such as crosslinking, heating, fusing, compressing, and melting ion exchange material can be performed after placing the mixture in a battery casing.

Battery and Cell Design

The battery cells can have any of a number of different shapes and sizes. For example, coin, prismatic, pouch or cylindrical cells can be used. Cylindrical cells of this invention may have the diameter and length of conventional AAA cells, AA cells, A cells, C, or D or 18650 or 26650 or 21700 cells. Custom cell designs can be used in some applications. For example, prismatic cell designs can be used for portable or vehicular applications, as well as various larger format cells employed for various non-portable applications. A battery pack can be specifically designed for particular tools or applications. Battery packs can include one or more battery cells and appropriate casing, contacts, and conductive lines to permit reliable charge and discharge in an electric device.

Figure 2A:
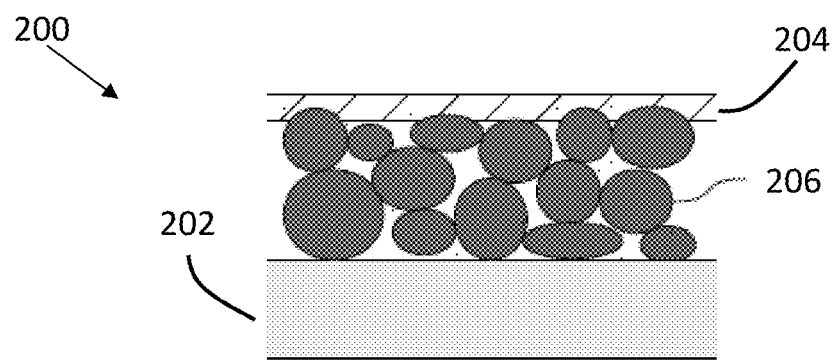
FIGS. 2A-C illustrates various forms of contact between electrode particles and ionic exchange material.
Figure 2B:
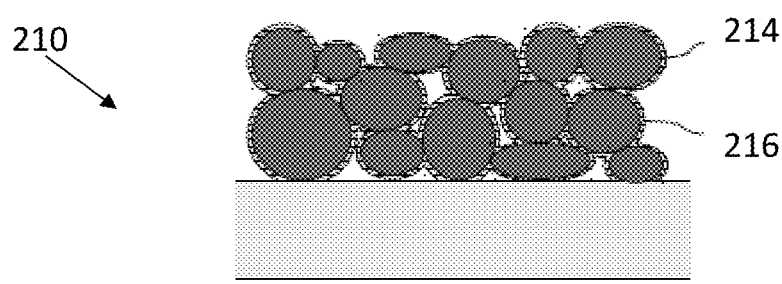
Figure 2C:
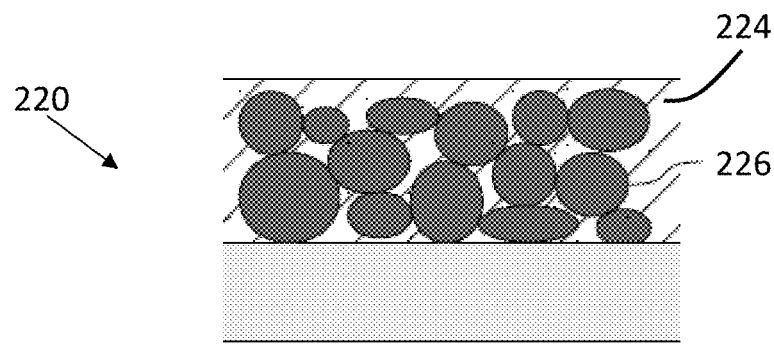

FIGS. 2A-C illustrate a portion of rechargeable battery cells 200, 210, and 220 that include an electrode and an ion exchange material arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material. In one embodiment, coating electrodes can be accomplished using a n-mer based processing that involves coating electrodes with a n-mer that can be crosslinked to form the ion exchanged material.

FIG. 2A illustrates a rechargeable battery cell 200 including a collector 202 contacting at least some of a plurality of electrochemically active particles 206. Another set of particles 206 also contact and are partially embedded in an ion exchange membrane 204. This ion exchange membrane can be positioned by partially melting, fusing, laminating, or pressure attachment to the particles 206. An electrolyte (not shown) can also be provided to fill in particle pore spaces and contact ion exchange membrane 204.

FIG. 2B illustrates a rechargeable battery cell 210 including a collector 212. Each of the particles 216 contacts and is surrounded by an ion exchange membrane 214. This ion exchange membrane can be positioned by coating attachment to the particles 216 prior to incorporation of the particles into the rechargeable battery cell. An electrolyte (not shown) can also be provided to fill in particle pore spaces and contact the ion exchange membrane 214.

FIG. 2C illustrates a rechargeable battery cell 220 including a collector 222 contacting at least some of a plurality of electrochemically active particles 226. Another set of particles 226 also contact and are fully embedded in an ion exchange membrane 224. This ion exchange membrane can be positioned by melting or fusing attachment to the particles 226. An electrolyte (not shown) can also be provided in contact with the ion exchange membrane 214.

Example 1

The example describes the fabrication of a ZnO-based anode for an alkaline rechargeable battery with an anion exchange membrane embedded into the electrode on the surface by lamination. The following paste composition was used for the anode preparation: ZnO (94 w. %), carbon nanotubes (1 w. %), PTFE (5 w. %). This composition was used to prepare a viscous paste having 27 w. % of water. The paste was spread to form a ~0.6 mm-thick uniform film. The film was applied to a brass wire cloth current collector. The anode film applied to the current collector was dried in a vacuum at 70° C. overnight and then compressed using a calendar roller press. After that, 37 mm×25 mm electrodes were cut out of the film on the current collector, and a nickel strip tab was attached to the electrodes. The electrode was laminated with an anion exchange membrane on both sides using the SKY-325R6 lamination machine at 140° C., using speed setting 2.

Example 2

The example describes the fabrication of rechargeable alkaline nickel-zinc cell having a ZnO-based anode with an anion exchange membrane embedded into the electrode on the surface. The anode for the cell was prepared as described in Example 1 above. A commercial sintered nickel electrode was used as a cathode. The cathode size was 40 mm×27 mm, and the capacity was 27 mAh/cm$^2$. A nickel strip was welded to each cathode to form electrode tabs. Each cathode was sealed in a paper separator. The anode was sandwiched between the cathodes on both sides, forming an electrode stack. The electrode stack was placed inside a polypropylene pouch with an attached pressure relief valve so that electrode tabs were sticking out of the pouch. 2 ml of electrolyte (20% KOH in water) was added to the cell. After that, the cell was sealed using a heat sealer.

Figure 3:
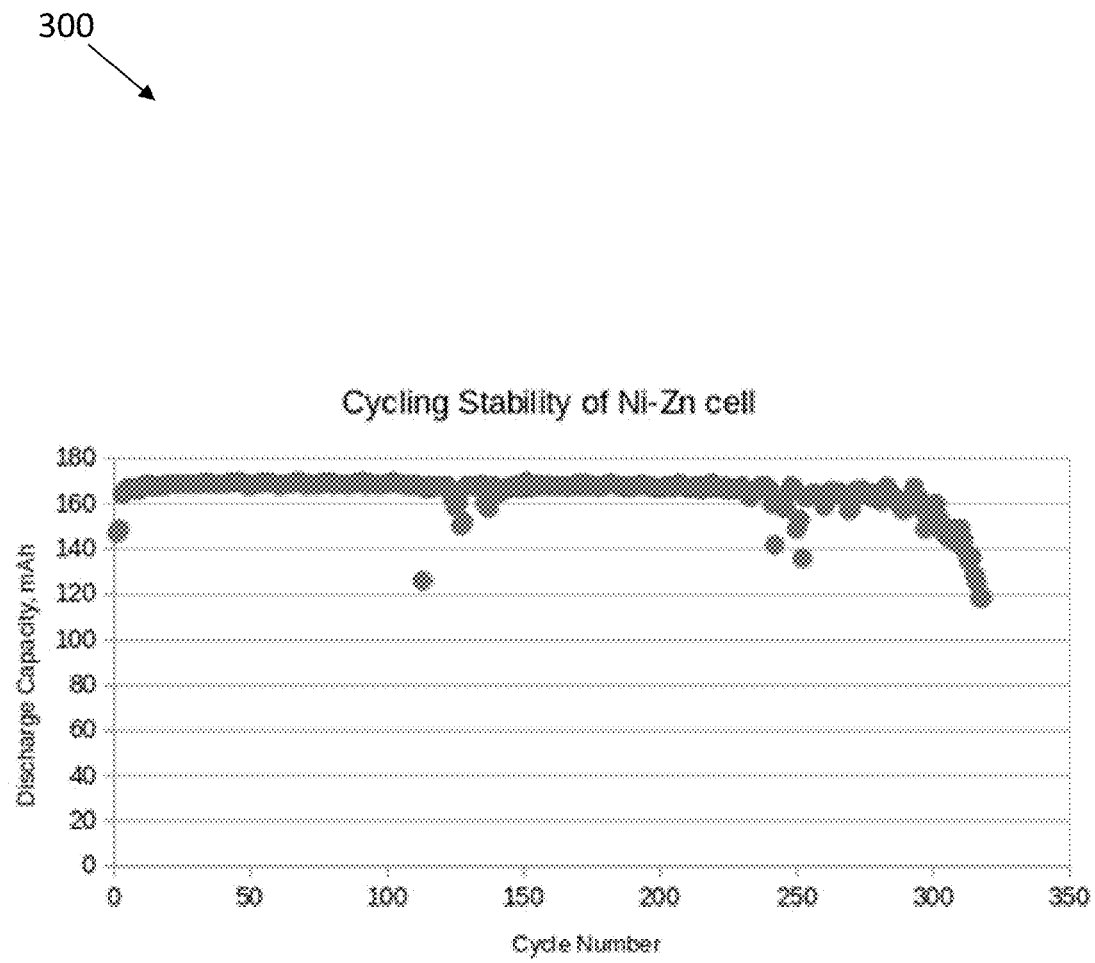
FIG. 3 is a graph illustrating discharge capacity for a Ni—Zn cell as a function of cycle number

The cell was left soaking for 4 hours and then charged and subsequently subjected to charge-discharge cycling with the following test protocol: constant current charge at 162 mA up to 1.95V followed by constant voltage charge to 173 mAh total capacity; constant current discharge to 1.2V or 173 mAh. The test was carried out at room temperature. Discharge capacity for the Ni—Zn cell as a function of cycle number is illustrated in FIG. 3 as graph 300.

Example 3

The example describes the fabrication of a Zn metal-based anode for an alkaline rechargeable battery with an anion exchange membrane embedded into the electrode on the surface by lamination. The following paste composition was used for the anode preparation: Zn (79 w. %), ZnO (14.5%), $Bi_2O_3$ (0.5%), PTFE (5.8 w. %), CMC (0.2%). This composition was used to prepare a viscous paste having 12 w. % of water. The paste was spread to form a ~0.6 mm thick uniform film. The film was applied to a brass wire cloth current collector. The anode film applied to the current collector was dried in a vacuum at 70° C. overnight and then compressed using a calender roller press. After that, 37 mm×25 mm electrodes were cut out of the film on the current collector, and a nickel strip tab was attached to the electrodes. The electrode was laminated with an anion exchange membrane on both sides using the SKY-325R6 lamination machine at 140° C., using speed setting 2.

A cross-section sample was prepared from the formed anode using the pot and polish technique. Cross-section SEM images and results of EDX analysis are shown in FIGS. 4, 5, 6A, and 6B.

Figure 4:
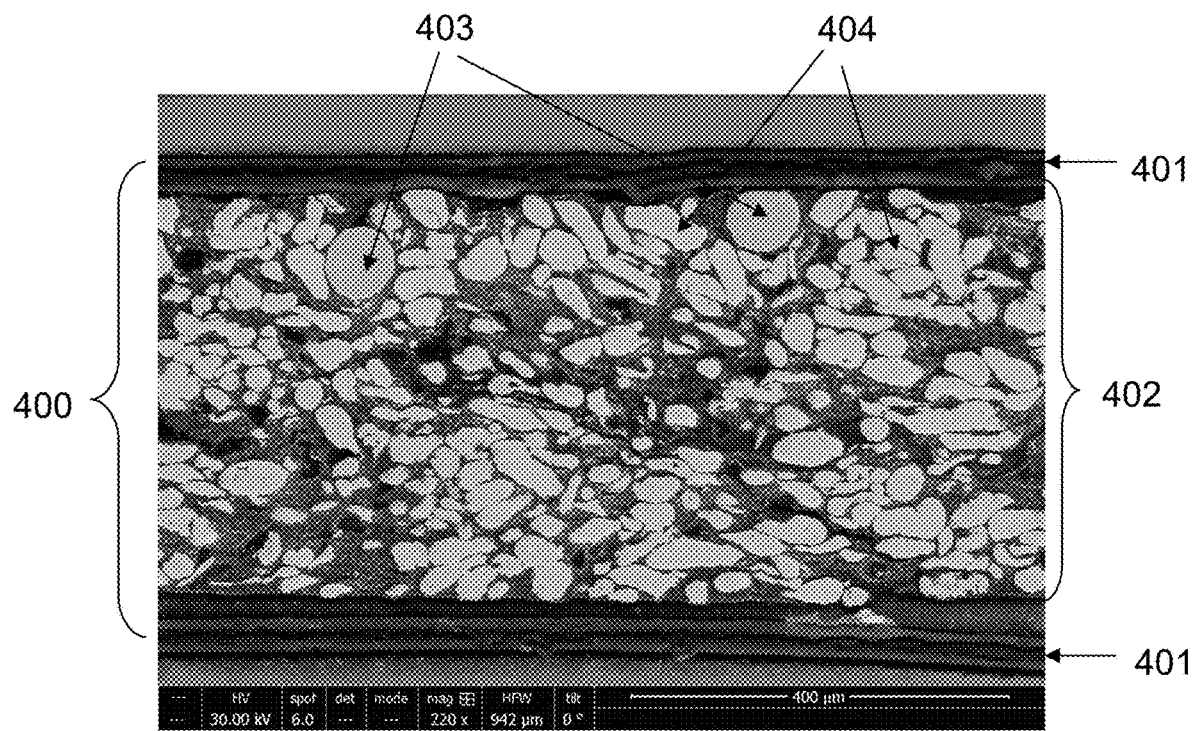
FIG. 4 shows a cross sectional SEM image of Zn electrode laminated on both sides with anion exchange membrane.

FIG. 4 shows a cross sectional SEM image of Zn electrode laminated on both sides with anion exchange membrane. An anode 400 including an anion exchange membrane 401 is laminated on both sides of the electrochemically active layer 402 with embedded brass mesh current collector 403. The electrochemically active layer consists of Zn metal particles 404 are mixed with ZnO, $Bi_2O_3$ as additives and PTFE as a binder.

Figure 5:
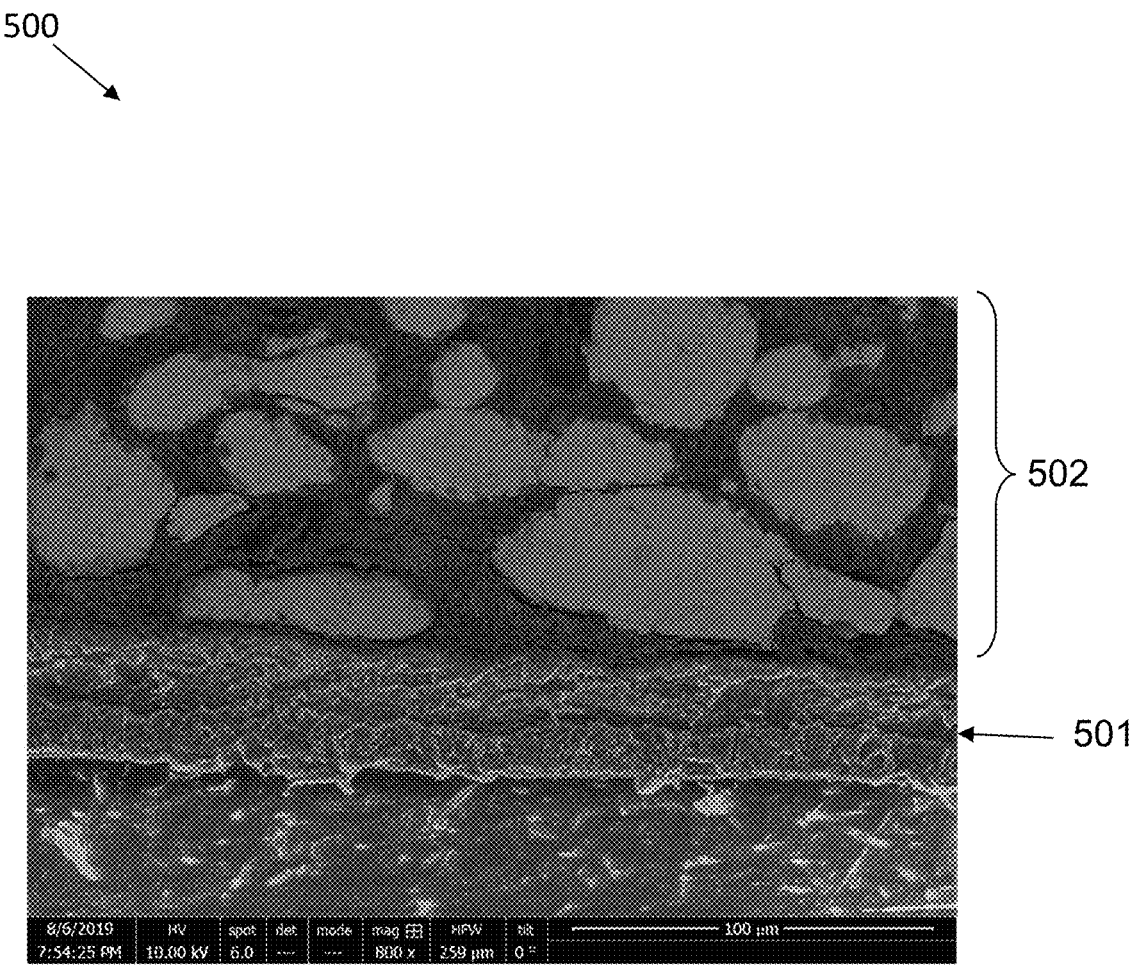
FIG. 5 shows a more detailed SEM image of Zn electrode laminated on both sides with anion exchange membrane.

FIG. 5 shows a SEM image 500 of Zn electrode laminated on both sides with anion exchange membrane (cross-section). The image shows a close up view of an intimate contact between membrane anion exchange material 501 (corresponding to membrane anion exchange material 401 of FIG. 4) and electrode electrochemically active mass 502 (corresponding to electrochemically active layer 402 of FIG. 4).

Figure 6A:
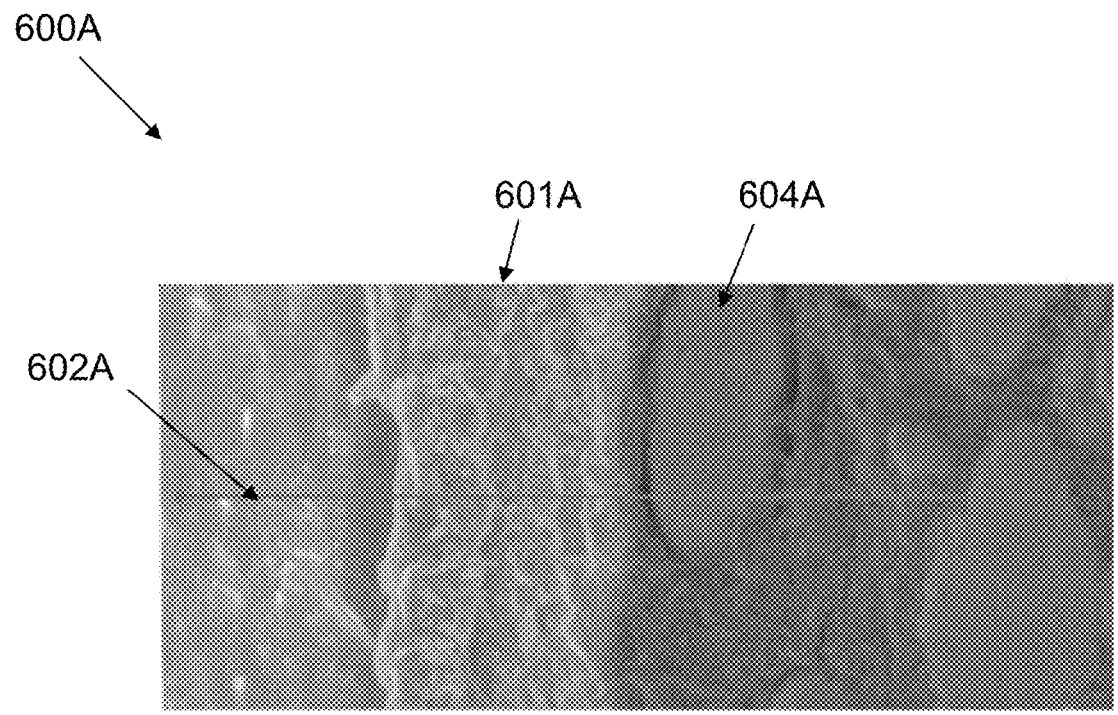
FIGS. 6A and 6B shows an SEM image and an associated line EDX elemental scan.
Figure 6B:
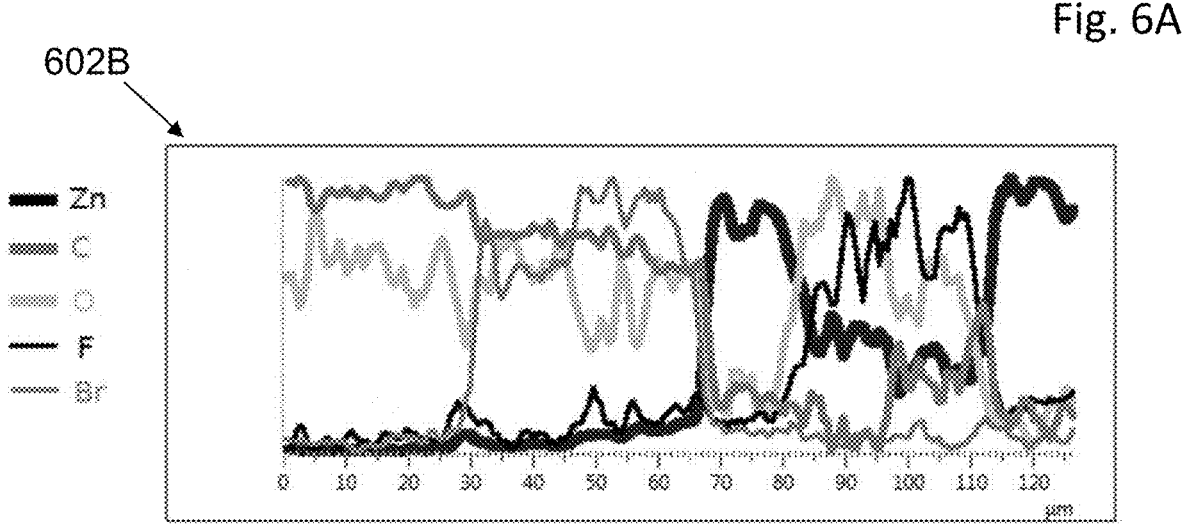

FIG. 6A shows an SEM image (image 600A and EDX elemental cross-section scan line 602A). FIG. 6B is a graph 602B showing the associated EDX elemental cross-section scan (taken along scan line 602A in FIG. 6A) that graphically illustrates the intimate interface between anion exchange membrane 601A (corresponding to membrane anion exchange material 401 of FIG. 4) and a Zn particle 604 (corresponding to Zn particle 404 of FIG. 4) in the anode. Elemental distribution shows overlapping signals for Zn (Zn particle) and C, O, and Br (anion exchange membrane components).

Figure 7:
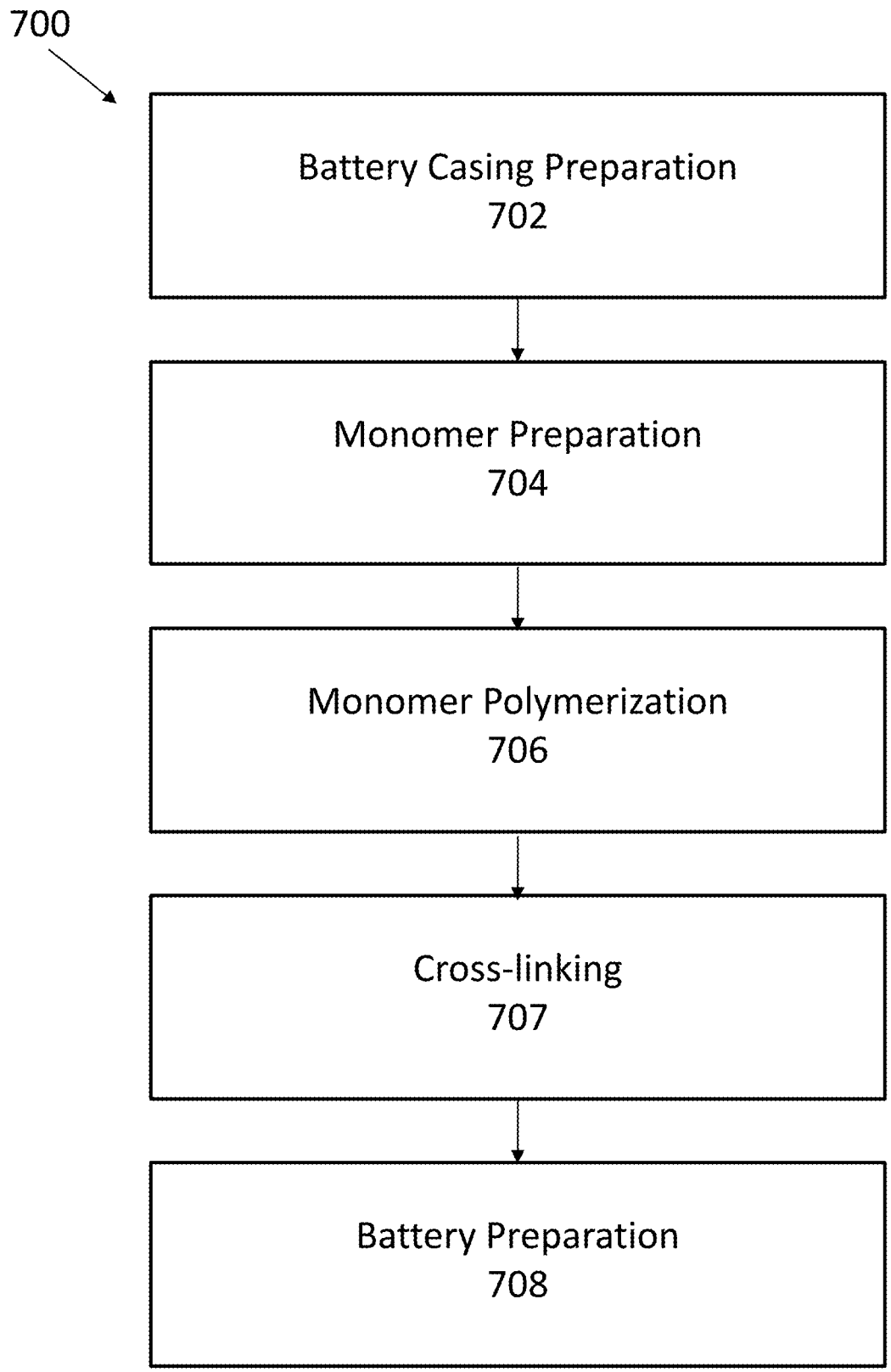
FIG. 7 shows one embodiment of a n-mer based battery manufacturing process.

FIG. 7 illustrates one embodiment of a process 700 for n-mer based processing for coating electrodes with an ion exchange material. Process steps include battery casing preparation 702. In one embodiment, step 702 includes placing electrode material formed from particles provided in various forms such as powders, granules, pellets, or nanomaterial into the casing. In step 704, a functionalized n-mer is sprayed or otherwise used to coat particles. In step 706, the n-mer is polymerized using heat, UV, or crosslinking agents to form an ion exchange material that fully or partially coats the electrode. In step 707 the polymerized n-mer is further cross-linked. Steps 706 and 707 may happen simultaneously or sequentially. In some embodiments, the ion exchange material is arranged to define an interpenetrating interface with at least a portion of the electrode. Providing an interpenetration interface in intimate contact can include completely or partially embedding the electrode in the ion exchange material. In one embodiment, electrodes can be particles fully or partially embedded, coated with, or partially contacting ion exchange material. In another embodiment, electrode particles can be mixed or otherwise intermingled with ion exchange material.

In some embodiments, steps 704 through 706 can be repeated with the same electrode material to allow for a layer by layer build. In other embodiments, a different electrode material can be used with the same or different n-mer material, providing for example, a cathode with a first type of ion exchange material coating and anode with a second type of ion exchange coating, both cathode and anode being positioned within the battery casing. In a final step 708 the battery can be prepared by providing any necessary electrical interconnections and sealing the casing.

Figure 8:
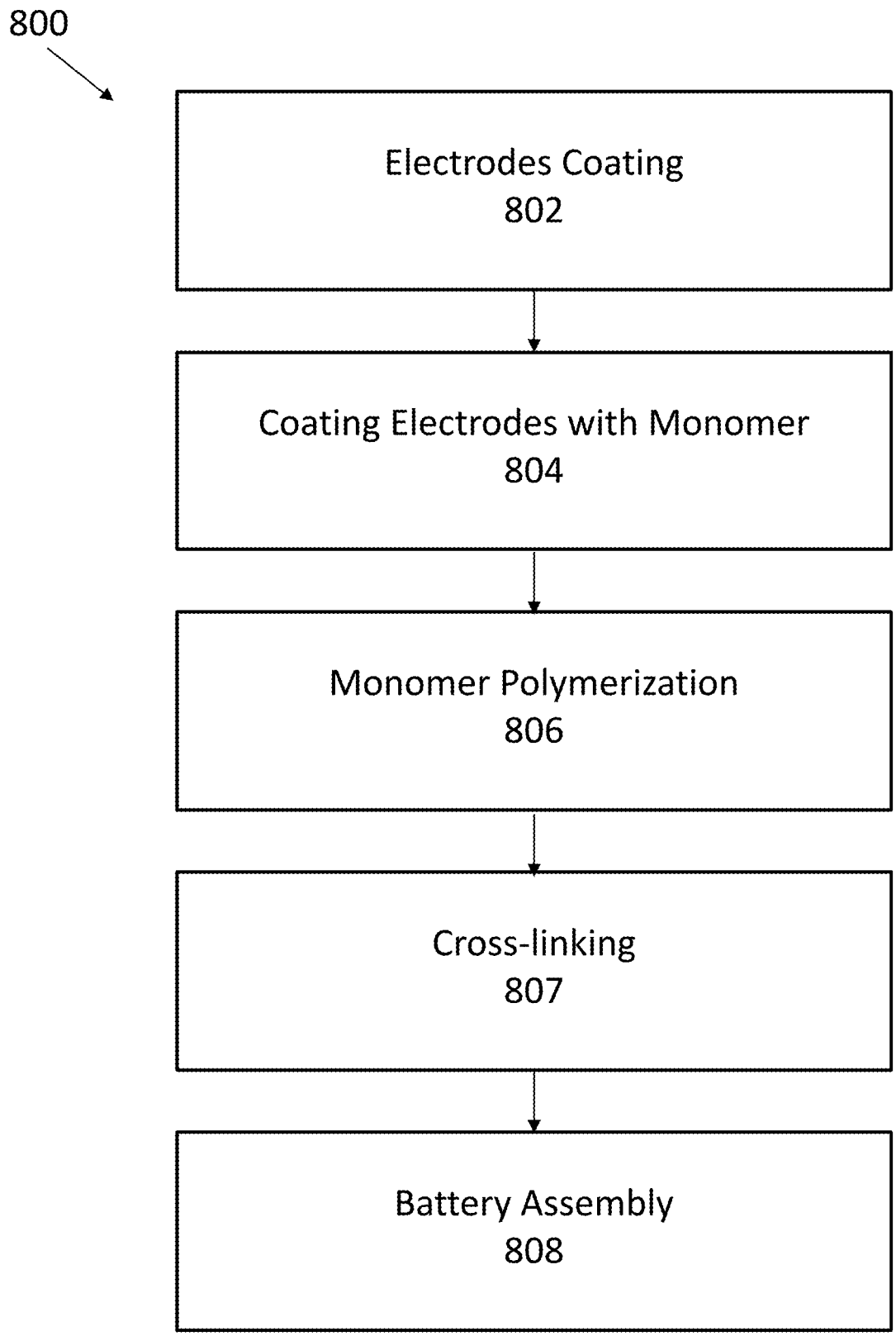
FIG. 8 shows another embodiment of a n-mer based battery manufacturing process.

FIG. 8 illustrates one embodiment of a process 800 for n-mer based processing for coating electrodes with an ion exchange material. Process steps include coating of electrodes 802. In step 804, a functionalized n-mer is coated over the electrodes. The step 804 can be done on the same coating line as electrodes using extrusion, slot-die coating or doctor blade coating. In some embodiments, step 804 can be done as a batch process by soaking the coated electrodes in baths of the n-mer solution or melt. In step 806, the n-mer that was coated over the electrodes is polymerized using heat, UV, or crosslinking agents to form an ion exchange material that fully or partially coats the electrode. In step 807 the polymerized n-mer is further cross-linked. Steps 806 and 807 may happen simultaneously or sequentially. In some embodiments, the ion exchange material is arranged to define an interpenetrating interface with at least a portion of the electrode. Providing an interpenetration interface in intimate contact can include completely or partially embedding the electrode in the ion exchange material. In one embodiment, electrodes can be particles fully or partially embedded, coated with, or partially contacting ion exchange material. In another embodiment, electrode particles can be mixed or otherwise intermingled with ion exchange material.

In some embodiments, steps 804 through 806 can be repeated with the same electrode material to allow for a layer by layer build. In other embodiments, a different electrode material can be used with the same or different n-mer material, providing for example, a cathode with a first type of ion exchange material coating and anode with a second type of ion exchange coating. In a final step 808 the battery can be assembled by stacking, winding or folding anode, cathode and separator, filling the battery with an electrolyte, providing any necessary electrical interconnections and sealing the casing.

Example 4

This example describes an n-mer-based coating of a Zn-based anode for an alkaline rechargeable battery with an anion exchange n-mer embedded into the electrode, polymerized by thermal treatment, followed by an anion exchange reaction during soaking in alkaline electrolyte.

The following paste composition was used for the anode preparation: Zn (79.6 w. %), ZnO (14.6 w. %), $Bi_2O_3$ (0.5 w. %), PTFE (5.1 w. %), CMC (0.2 w. %). This composition was used to prepare a viscous paste having 10 w. % of water. The paste was spread to form a ~0.6 mm-thick uniform film. The film was applied to a brass wire cloth current collector. The anode film applied to the current collector was dried in a vacuum at 70° C. overnight and then compressed using a calender roller press. After that, 37 mm×25 mm electrodes were cut out of the film on the current collector, and a nickel strip tab was attached to the electrodes.

The electrodes were dip coated with 25 w. % solution of (vinylbenzyl)trimethylammonium chloride (VBTMA-Cl) in iso-propanol (IPA). The electrodes were dried in air at room temperature. Then the electrodes were heat treated in vacuum at 160° C. for 4 hours. The heat treatment leads to polymerization of VBTMA-Cl and formation of poly-(vinylbenzyl)trimethylammonium chloride that is not soluble in IPA or water. The electrodes were run through SKY-325R6 lamination machine at 140° C. using speed setting 4 to smooth out the electrodes surface covered with the polymer.

The Zn electrodes treated with VBTMA-Cl were used to assemble three electrode electrochemical cells with NiOOH as a counter electrode and $NiOOH/Ni(OH)_2$ reference electrode at 50% state of charge. The cells were filled with 20% KOH solution in water and left for soaking for 24 hours.

During treatment, chemical transformations with the VBTMA compound include polymerization during thermal treatment and ion exchange during soaking in KOH solution:

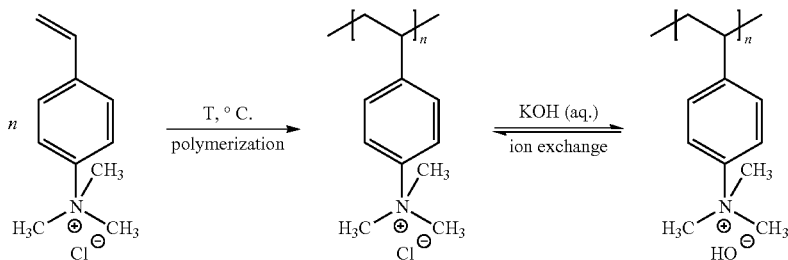

Cl— anion is replaced with OH— anion. The overall process leads to the formation of the anion exchange polymer covering electrode particles. The polymer is ionically conductive and can transport OH— ions to the electrode.

Figure 9:
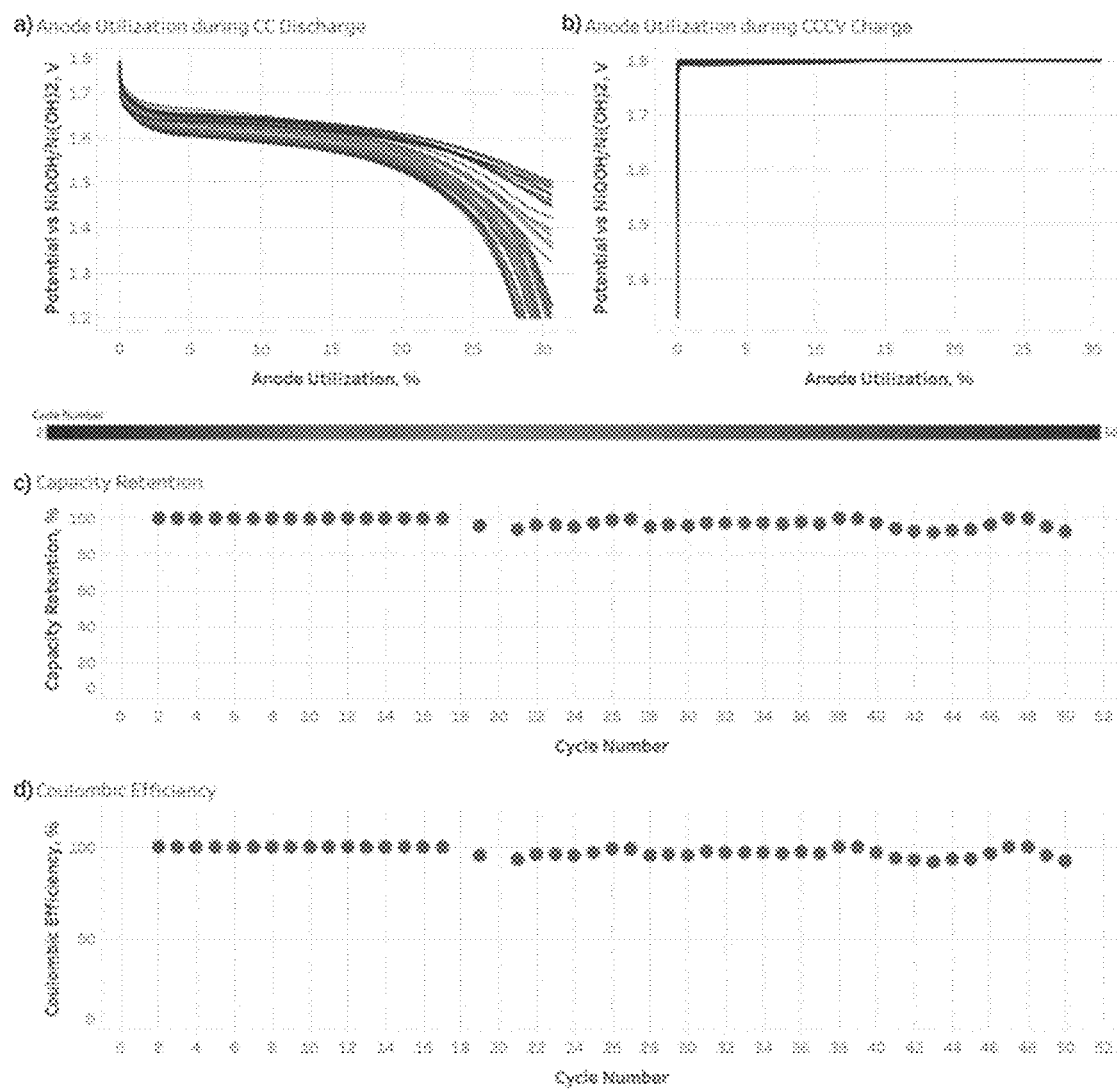
FIG. 9 shows performance plots for NiZn battery with Zn-based anode treated with a venylbenzyltrimethylammonium-based (VBTMA) monomer that was further polymerized using heat treatment. The shown performance plots include (a) discharge and (b) charge voltage profiles as functions of anode utilization; (c) capacity retention and (d) coulombic efficiency of the NiZn battery.

Rated capacity for the cells was defined as the theoretical capacity of Zn electrodes. The cells were left soaking for 24 hours before testing and then discharged at C/4 rate to 30% of theoretical Zn capacity and subsequently subjected to charge-discharge cycling with the following test protocol: constant current charge at C/4 current rate up to 1.8V followed by constant voltage charge to 30% of theoretical Zn capacity with 1 mA current cutoff; constant current discharge at C/4 rate to 1.2V or 173 mAh. The test was carried out at room temperature. Discharge voltage vs. capacity curves for the cell as a function of cycle number are illustrated in FIG. 9, which includes chart a) for the first 50 cycles. Chart b) in FIG. 9 shows the voltage of the Zn electrodes vs. the Reference electrode during charging in the first 50 cycles. Chart c) and chart d) in FIG. 9 show capacity retention and coulombic efficiency of the cell during the first 50 cycles respectively.

In effect, the electrode treated with VBTMA compound shows good cycling stability and high coulombic efficiency at the relatively high utilization level of 30% of the theoretical capacity.

Example 5

This example describes the fabrication of a ZnO-based anode for an alkaline rechargeable battery with an anion exchange membrane embedded into the electrode on the surface by lamination. The following paste composition was used for the anode preparation: ZnO (89.4 w. %), carbon nanotubes (1 w. %), PTFE (4.8 w. %), CMC (0.2%), KOH (4.8%). This composition was used to prepare a viscous paste having 21 w. % of water. The paste was spread to form a 300 μm-thick uniform film. The film was applied to a brass wire cloth current collector. The anode film applied to the current collector was dried in a vacuum at 70° C. overnight and then compressed using a calendar roller press. After that, 37 mm×25 mm electrodes were cut out of the film on the current collector, and nickel strip tabs were attached to the electrodes. An electrode prepared as described above was laminated with an anion exchange membrane on both sides using a hot-cold lamination press with settings of 160° C. for 150 sec, followed by 10° C. for 150 sec.

Example 6

This example describes the fabrication of a rechargeable alkaline nickel-zinc cell having a ZnO-based anode with an anion exchange membrane embedded into the electrode on the surface. The anode for the cell was prepared as described in Example A above. A commercial sintered nickel electrode was used as a cathode. The cathode size was 40 mm×27 mm, and the capacity was 27 mAh/cm2. A nickel strip was welded to each cathode to form electrode tabs. Each cathode was sealed in a paper separator. The anode was pared with one of the cathodes, forming an electrode stack. The electrode stack was placed inside a polypropylene pouch so that electrode tabs stuck out of the pouch. 1.5 ml of electrolyte (20% KOH in water) was added to the cell. After that, the cell was sealed using a heat sealer.

Figure 10:
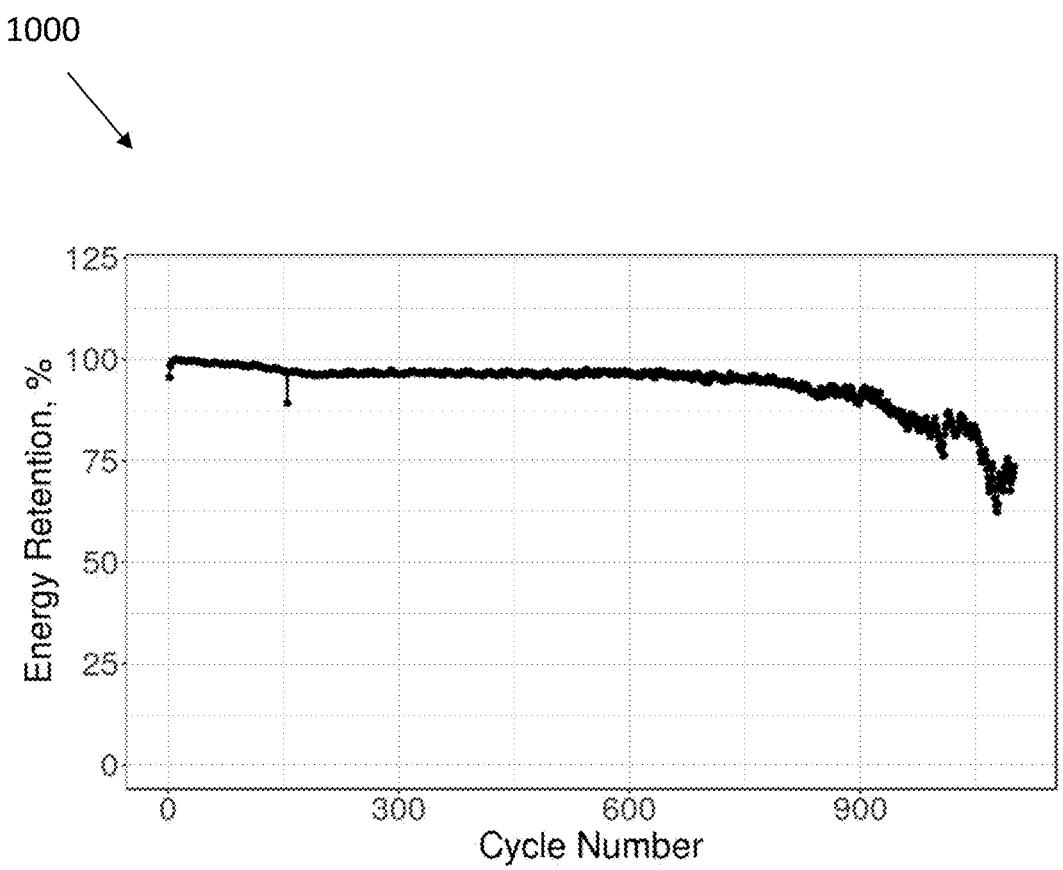
FIG. 10 is a graph illustrating discharge energy as a percentage of maximal discharge energy demonstrated by the cell during this test (energy retention) for the Ni—Zn cell as a function of cycle number.
Figure 11:
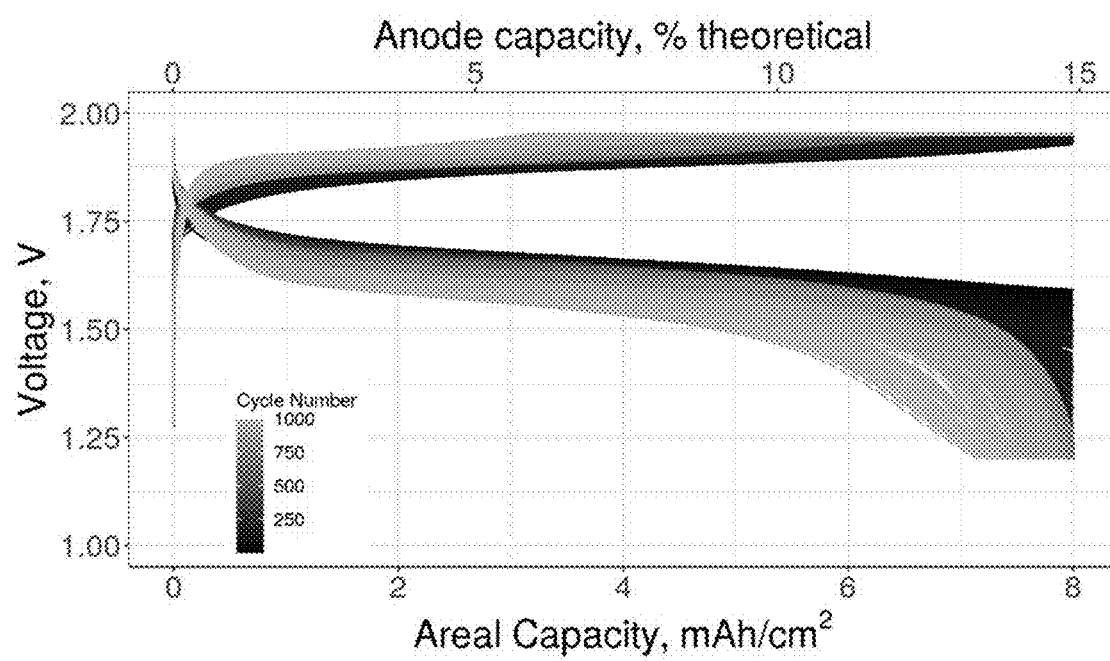
FIG. 11 is a graph illustrating voltage of the NiZn cell as a function of capacity (expressed as % of theoretical anode capacity on the upper horizontal axis and as an areal capacity on the bottom horizontal axis)

The cell was left soaking for 24 hours and then charged and subsequently subjected to charge-discharge cycling with the following test protocol: constant current charge at 162 mA up to 1.95V followed by constant voltage charge to 173 mAh total capacity; constant current discharge to 1.2V or 173 mAh. The test was carried out at room temperature. Discharge energy as a percentage of maximal discharge energy demonstrated by the cell during this test (energy retention) for the Ni—Zn cell as a function of cycle number is illustrated in graph 1000 of FIG. 10. In addition, associated graph 1100 of FIG. 11 shows voltage of the NiZn cell as a function of capacity (expressed as % of theoretical anode capacity on the upper horizontal axis and as an areal capacity on the bottom horizontal axis).

Example 7

This example describes an alkaline battery with $MnO_2$-based cathode and Zn metal-based anode. Cathode size was 40 mm×27 mm; anode size was 37 mm×25 mm. Both anode and cathode in this example were covered with anion exchange material in the form of membrane using hot-cold lamination press with settings 160° C. for 150 sec followed by 10° C. for 150 sec. The cathode and the anode were stacked together with polypropylene non-woven separator sandwiched between the electrodes. The electrodes stack was placed inside polypropylene pouch so that electrode tabs were sticking out of the pouch. 1.5 ml of electrolyte (20% KOH in water) was added to the cell. After that the cell was sealed using heat sealer.

Figure 12:
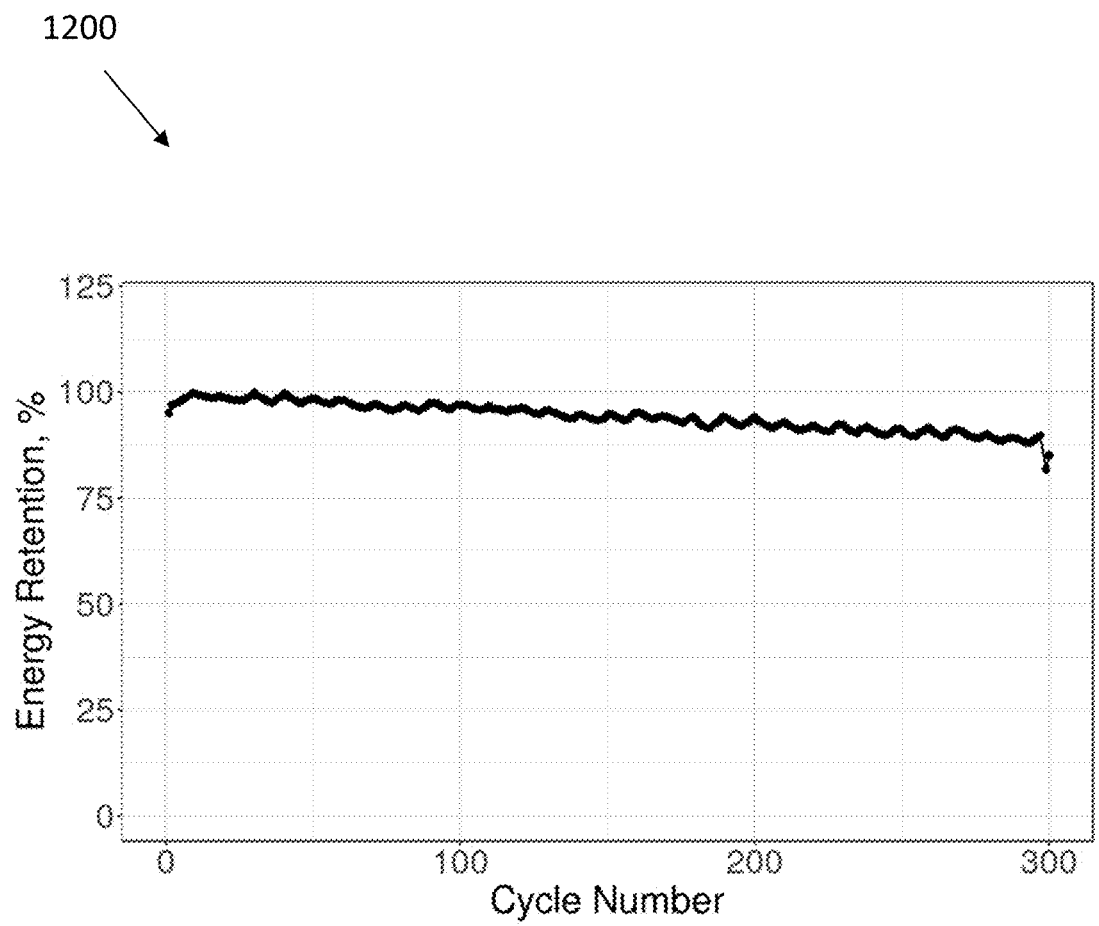
FIG. 12 is a graph illustrating discharge energy as a percentage of maximal discharge energy demonstrated by the cell during this test (energy retention) for the $MnO_2$—Zn cell as a function of cycle number.
Figure 13:
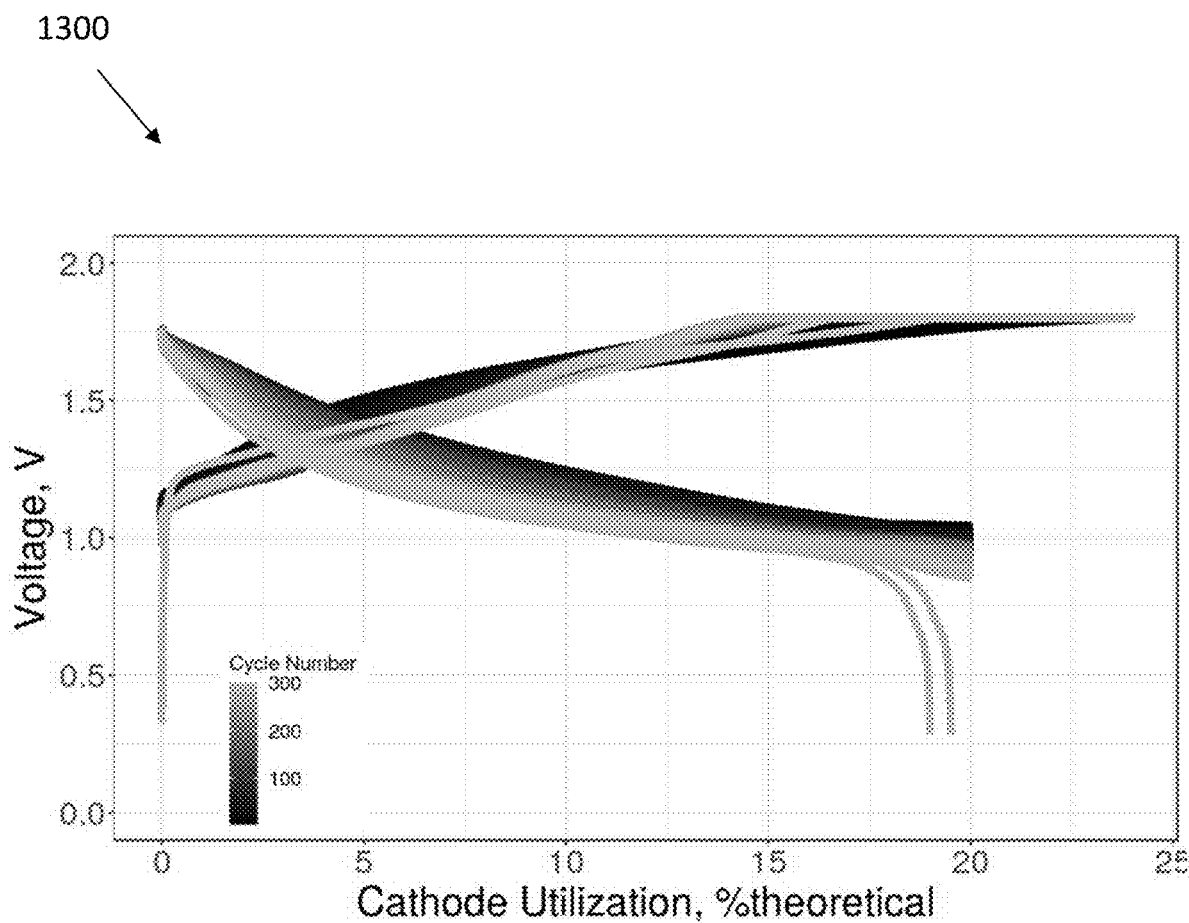
FIG. 13 is a graph illustrating voltage of the $MnO_2$—Zn cell as a function of capacity (expressed as % of theoretical cathode capacity).

The cell rated capacity was defined as a theoretical capacity of the cathode (617 mAh/g of $MnO_2$). The cell was left soaking for 2 hours and subjected to charge-discharge cycling with the following test protocol: constant current discharge at C/5 to 0.3V or 20% of the rated capacity followed by constant current/constant voltage charge at C/5 to 24% of the rated capacity 1.8V and current cutoff at C/25. The test was carried out at room temperature. Discharge energy as a percentage of maximal discharge energy demonstrated by the cell during this test (energy retention) for the $MnO_2$—Zn cell as a function of cycle number is illustrated in graph 1200 of FIG. 12. In addition, associated graph 1300 of FIG. 13 illustrates voltage of the $MnO_2$—Zn cell as a function of capacity (expressed as % of theoretical cathode capacity).

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method of manufacturing a battery cell, the method comprising:
    forming an electrode comprising zinc particles and operable as a negative electrode in the battery cell;
    coating the electrode with an n-mer solution such that the n-mer solution forms a layer over the electrode and at least partially embeds into the electrode after coating the electrode with the n-mer solution; and
    curing the n-mer solution thereby forming an ion exchange coating partially embedded into the electrode and contacting at least a portion of the zinc particles of the electrode; and
    soaking the electrode with the ion exchange coating in a solution comprising hydroxide anions, thereby at least partially replacing n-mer anions with the hydroxide anions and converting the ion exchange coating into a hydroxide-based ion exchange coating.

2. The method of manufacturing the battery cell of claim 1, wherein the n-mer solution comprises at least one of a monomer, an oligomer, a branched polymer, or an unbranched polymer.

3. The method of manufacturing the battery cell of claim 1, wherein curing further comprises exposing the ion exchange coating to heat, ultraviolet, or chemical agent thereby inducing crosslinking in the ion exchange coating.

4. The method of manufacturing the battery cell of claim 1, further comprising arranging the negative electrode with a positive electrode comprising one or more materials selected from the group consisting of nickel hydroxide $(Ni(OH)_2)$, nickel oxyhydroxide (NiOOH), manganese dioxide $(MnO_2)$, manganese oxide (MnO), a ferrate salt (Fe(VI)), a manganate salt (Mn(VI)), and a permanganate salt (Mn(VII)).

5. The method of manufacturing the battery cell of claim 1, wherein the zinc particles are sized to be less than 300 microns and packed to have a nonzero pore volume less than 50% of total electrode volume.

6. The method of manufacturing the battery cell of claim 1, wherein forming the electrode comprises forming an active material layer over a current collector.

7. The method of manufacturing the battery cell of claim 6, wherein the current collector comprises one or more materials selected from the group consisting of copper and zinc.

8. The method of manufacturing the battery cell of claim 6, wherein the current collector has one or more forms selected from the group consisting of a plate form, a foil form, a mesh form, a porous sponge-like form, a punched metal form, a slotted metal form, and an expanded metal form.

9. The method of manufacturing the battery cell of claim 1, wherein the electrode further comprises zinc oxide particles in addition to the zinc particles.

10. The method of manufacturing the battery cell of claim 9, wherein the electrode further comprises bismuth oxide $(Bi_2O_3)$ in addition to the zinc oxide particles and the zinc particles.

11. The method of manufacturing the battery cell of claim 1, wherein the hydroxide-based ion exchange coating further comprises one or more functional groups selected from the group consisting of sulfonic acid, a quaternary amino group, a carboxylic acid group, a primary amino group, a secondary amino group, and a tertiary amino group.

12. The method of manufacturing the battery cell of claim 11, wherein the one or more functional groups of the hydroxide-based ion exchange coating comprise the sulfonic acid selected from the group consisting of sodium polystyrene sulfonate and poly-2-acrylamido-2-methyl-1-propanesulfonic acid (polyAMPS).

13. The method of manufacturing the battery cell of claim 11, wherein the one or more functional groups of the hydroxide-based ion exchange coating comprise poly-acrylamido-N-propyltrimethylammonium chloride (PolyAPTAC).

14. The method of manufacturing the battery cell of claim 11, wherein the one or more functional groups of the hydroxide-based ion exchange coating comprise carboxylic acid groups.

15. The method of manufacturing the battery cell of claim 11, wherein the one or more functional groups of the hydroxide-based ion exchange coating comprise polyethylene amine.

16. The method of manufacturing the battery cell of claim 1, wherein the n-mer solution comprises one or more compounds selected from the group consisting of a (3-acrylamidopropyl)trimethylammonium compound, [3-(methacryloylamino)propyl]trimethylammonium compound, a [2-(acryloyloxy)ethyl]trimethylammonium compound, a [2-(nethacryloyloxy)ethyl]trimethylammonium compound, a (vinylbenzyl)trimethylammonium compound, a 2-acrylamido-2-methyl-1-propanesulfonic acid compound, a 3-sulfopropyl acrylate compound, a 3-sulfopropyl metacrylate compound, a diallyldimethylammonium compound, a vinylbenzenesulfonate compound, and a N-(3-aminopropyl) methacrylamide compound.

* * * * *